Nov. 21, 1950     M. A. SCHULTZ     2,530,911
ADJUSTABLE CAP FOR WATER FOUNTAINS
Filed May 14, 1946
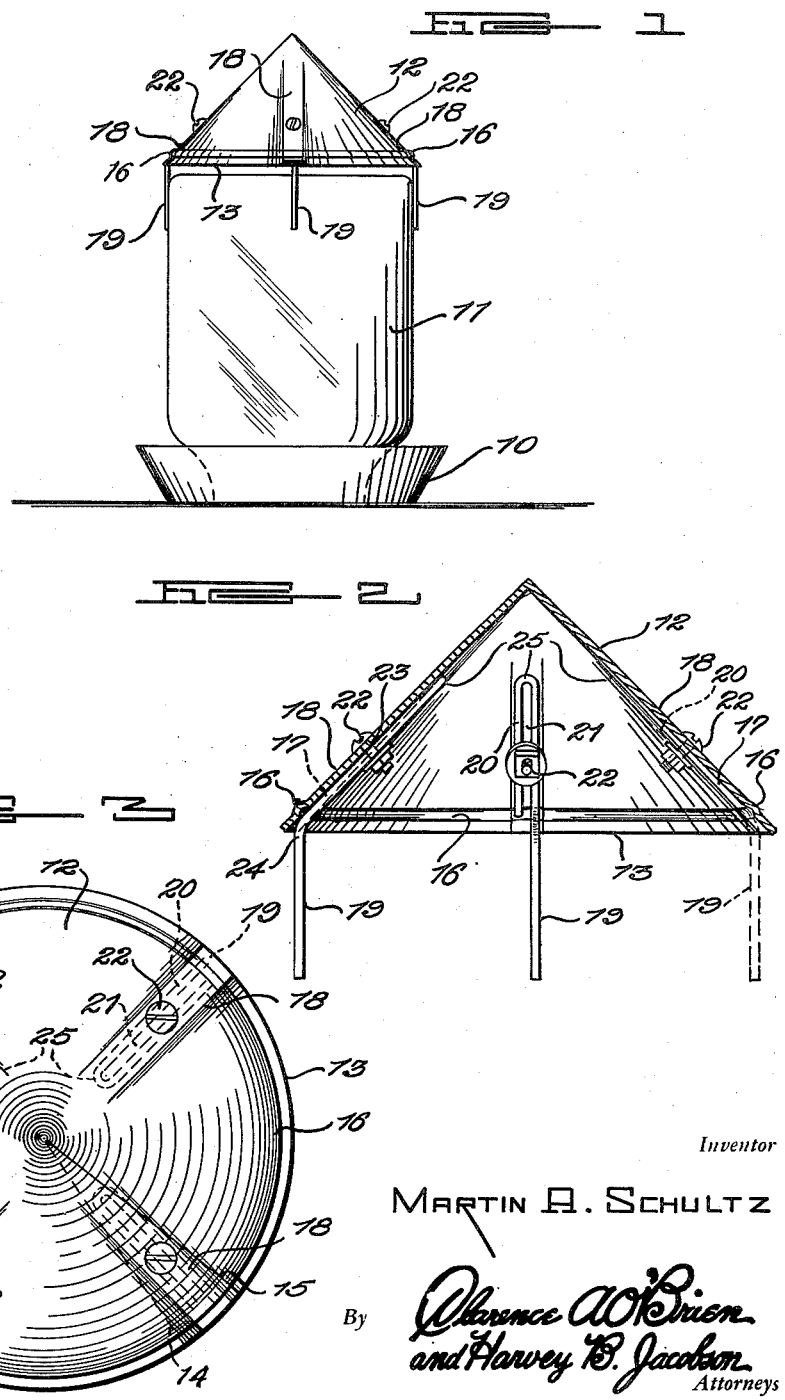
Inventor
MARTIN A. SCHULTZ
By Clarence A. O'Brien
and Harvey B. Jacobson
Attorneys Patented Nov. 21, 1950

2,530,911

UNITED STATES PATENT OFFICE 2,530,911

ADJUSTABLE CAP FOR WATER FOUNTAINS

Martin A. Schultz, Deshler, Nebr.

Application May 14, 1946, Serial No. 669,606

3 Claims. (Cl. 119—72)

This invention relates to poultry drinking fountains, and more particularly to an adjustable water preserver therefor, the purpose thereof being to provide an attachment adapted to be mounted upon water jars or vessels of poultry drinking fountains, to keep the chickens or other poultry from perching or roosting thereon and thus contaminating the drinking water, thereby maintaining the water in a sanitary condition and insuring raising and maintaining of good healthy poultry. It can be applied to feed fountains with equal facility.

It is well known that it is the nature of chickens and other poultry, after three weeks of age, to jump or fly upon any obstacle above the floor or ground or to perch or roost on anything they can get a foot-hold on. Thus, water fountains and vessels are usually employed by them to perch or roost, so that the droppings or manure is deposited or runs down the sides of fountains and directly into the water, so that the water and fountains becomes a mass of filth. With this condition, a diseased chicken can spread its illness over a whole flock, whereas cleanliness can be obtained, money and labor can be saved and more healthy flocks of chickens can be raised if this condition is eliminated.

An object of the present invention is therefore to provide a novel attachment which can be made in various sizes to fit the jars or vessels of various drinking fountains or feeding devices of similar character, which will prevent the poultry or chickens from roosting on the top of such fountains or water containing jars or vessels thereof, and thus eliminate the conditions mentioned, thereby insuring a good healthy condition of the poultry.

Another object of the invention is to provide adjustable means including legs, carried by a conical cover or roost preventing member, which may be adjusted to fit different sizes of jars within certain ranges, and to firmly hold the attachment in position on the jar and against displacement.

Another object of the invention is to provide an adjustable water preserver in the form of an attachment which can be economically produced and sold, and which will admirably serve its purposes as stated.

Other objects and advantages reside in the details of construction and operation as more fully hereinafter described and claimed, reference being had to the accompanying drawings forming part hereof, wherein like numerals refer to like parts throughout, and in which:

Figure 1 is a side elevation of a poultry drinking or feeding fountain having the sanitary adjustable water preserver mounted thereon to prevent poultry or chickens from perching or roosting on the fountain.

Figure 2 is an enlarged diametrical sectional view of the device of the invention, and Figure 3 is a top plan view thereof.

Referring to the drawings, in which like reference characters designate corresponding parts throughout the several views, there is shown a poultry feeding or drinking fountain including a shallow pan 10, in which a water or like containing vessel or jar 11 is mounted in inverted position in the usual manner, to dip in the water or food in the pan while permitting the contents thereof to be supplied as consumed by access thereto around the jar and between the same and the rim of the pan in the usual way. This structure of the drinking or food fountain, may be of any well-known type.

The attachment or adjustable sanitary water preserver of the present invention is shown as comprising a conical member 12, of sheet metal, plastic, or other suitable material, or may be molded into the desired form, with a slope or 45° pitch, although the same may be more or slightly less so long as the chickens or other poultry are prevented from roosting or perching thereon, due to the inclination thereof. As shown, it may be of one solid piece or of a section stamped out flat, with a round or circular edge 13 and two radial straight edges 14 and 15, which upon the sheet being shaped or pressed into conical form, disposes segmental portions of the blank or sheet in overlapping relation to be connected as will be later described.

The cone is also provided around or adjacent the circular edge 13 but in spaced relation thereto, with an annular surrounding reinforcing crimp or bead 16, which is pressed outwardly in order to stiffen and reinforce the cone so as to render the same more rigid whereby it will maintain its form, especially under the weight of the poultry or chickens attempting to land or roost thereon. This will also maintain the shape of the cone so that it will properly conform to the surface of the vessel or jar 11 upon which it is adapted to be placed, to cover the flat top thereof and prevent the chickens or other poultry from perching or roosting, or even landing thereon.

The cone is also provided with a plurality of radial grooves 17 formed by up-pressed portions 18, preferably equi-distantly spaced apart and shown as four in number, although the number may be varied. These grooves and up-pressed portions, taper in depth toward the point or apex of the cone, that is, they become more shallow toward the apex, and deeper toward the edge 13 for the purpose of receiving and holding in place, a plurality of attaching legs 19. These legs are adjustably mounted in position in the grooves of the raised portions 18, and as shown, comprise sections of wire or other suitable material, of round, square or other cross section having upright or vertical depending lower portions adapted to fit the periphery of the vessel or jar 11 and snugly clamped thereto, in order to hold the preserver attachment in position. The upper portions of the legs constitute the opposite ends thereof and are rebent in substantially U-form, as indicated at 20, to provide slots or elongated openings 21 through which fastening bolts 22 are passed through openings 23 in the cone at suitable points spaced from the rim or edge 13 and the apex of the cone, but preferably closer to the edge 13, within the raised portions 18, one of which may be formed at the overlapping portions between the edges 14 and 15, as previously described, so as to firmly hold the overlapping portions in relation to each other and with the overlapping portions of the bead or crimp 16 lying one beneath the other. The legs 19 are angularly bent as at 24, where the portions 19 depend from the U-shaped or re-bent portions 20 adjacent the edge 13 and bead 16 beneath the cone, so as to be protected as well as permit the necessary adjustment of the legs outwardly to vary the diametrical distance between the legs, for fitting jars of different sizes within certain ranges. Thus, the bight portions 25 of the legs at the U-shaped portions 20 are disposed uppermost within the upwardly tapering grooves and raised portions 17 and 18 for adjustment in inclined planes inwardly and outwardly, to vary the distances between the legs. The bolts 22 preferably have the heads thereof at the top and may be the ordinary screw-heads with the bolts extending through the cone wall at the openings 23 where the raised portions 18 and grooves 17 are provided, including the overlapping portions between the edges 14 and 15 and held by the nuts threaded on the lower ends of the bolts with interposed lock washers if desired. It should be noted that the raised portions or grooves gradually decrease in depth toward the top or apex of the cone so as to merge into the normal wall thereof, but are of sufficient depth to maintain the wire legs in place and prevent the same from becoming displaced or coming out of their positions. The bead or crimp parallels the circular lower edge 13 of the cone.

It will thus be seen that I have provided an improvement in poultry drinking fountains, in the form of an adjustable water preserver, which when attached to the water or food containing vessel or the fountain or feeding device, will prevent the poultry or chickens from roosting on top of the jar or other container or vessel thereof, and will thus prevent the droppings from fouling the drinking water or food, thereby maintaining the same in a clean and sanitary condition to insure growth and maintenance of healthy poultry. The device may be made in various sizes to suit different sized jars, such as the quart, gallon or five-gallon sizes, or otherwise normally produced and sold on the market. The device may be made of any suitable cheap metal material, such as metal, plastic, fibre, paper or otherwise.

While in the foregoing there has been shown and described the preferred embodiment of this invention, it is to be understood that minor changes in the details of construction, combination and arrangement of the parts may be resorted to without departing from the spirit and scope of the invention as claimed.

What I claim is:

1. An adjustable water preserver for poultry drinking fountains comprising a hollow conical member having a plurality of equally spaced radial grooves in the inner side thereof, legs having outwardly inclined upper slotted portions slidably disposed in said grooves and vertical lower portions depending at the edge of the conical member, and means adjustably clamping said slotted portions of the legs in said grooves.

2. A water preserver cover for poultry drinking fountains comprising a hollow conical member having a plurality of equally spaced radial up-pressed portions providing grooves at the underside of the conical member, angular legs having vertical depending portions and outwardly inclined upper U-shaped portions forming slots and slidably engaged in said grooves for adjustment radially therein to vary the distance between said depending leg portions, and nutted clamping bolts disposed through the cone and the slots of the U-shaped portions to clamp the legs in adjusted position.

3. A sanitary adjustable water preserver for poultry drinking fountains comprising a hollow conical member having up-pressed portions forming upwardly tapering radial grooves decreasing in depth toward the apex of the conical member, angular legs having vertical depending portions and outwardly inclined upper U-shaped portions forming slots, said up-pressed portions having openings therein, and fastening bolts disposed through said openings and slots to provide for radial adjustment of the U-shaped portions and variation of the distances between the depending leg portions to fit fountain drinking vessels of different diameters.

MARTIN A. SCHULTZ.

REFERENCES CITED

The following references are of record in the file of this patent:

UNITED STATES PATENTS

| Number | Name | Date |
|---|---|---|
| 213,546 | Cornelius | Mar. 25, 1879 |
| 694,760 | Lathrop | Mar. 4, 1902 |
| 697,180 | Smith | Apr. 8, 1902 |
| 1,071,721 | Finlay | Sept. 2, 1913 |
| 1,454,946 | Baron | May 15, 1923 |
| 1,881,838 | Mohr | Oct. 11, 1932 |
| 1,917,371 | Hill | July 11, 1933 |
| 1,966,700 | Armstrong | July 17, 1934 |
| 2,210,047 | Stieglitz | Aug. 6, 1940 |
| 2,364,991 | Marshall | Dec. 12, 1944 |

FOREIGN PATENTS

| Number | Country | Date |
|---|---|---|
| 848,009 | France | July 17, 1939 |